United States Patent [19]
Shaver et al.

[11] 3,939,308
[45] Feb. 17, 1976

[54] ELECTRONIC SIDE OF LINE DETECTOR

[75] Inventors: David M. Shaver; John A. Gauthier, both of Brockville, Canada

[73] Assignee: GTE Automatic Electric (Canada) Limited, Brockville, Calif.

[22] Filed: Sept. 27, 1974

[21] Appl. No.: 510,082

[52] U.S. Cl................................. 179/17 A
[51] Int. Cl.²......................... H04M 15/36
[58] Field of Search.......... 179/17 A, 18 FH, 18 FA

[56] References Cited
UNITED STATES PATENTS

| | | | |
|---|---|---|---|
| 2,277,623 | 3/1942 | Allen | 179/17 A |
| 3,622,709 | 11/1971 | Tjaden | 179/18 F |
| 3,748,395 | 7/1973 | Herter | 179/18 FA |
| 3,808,377 | 4/1974 | Young | 179/18 FA |
| 3,812,303 | 5/1974 | Stewart | 179/175.3 R |
| 3,821,486 | 6/1974 | Mussman | 179/18 FA |

*Primary Examiner*—Kathleen H. Claffy
*Assistant Examiner*—Randall P. Myers

[57] ABSTRACT

A side of line detector with a single operational amplifier with adjustable output. The amplifier input is protected from positive and negative voltage spikes by diodes. Two transistors are coupled to the amplifier to set a comparator voltage reference which allows the rejection of leakage and noise. Test points are provided in the circuit to facilitate testing particular subcircuits and to allow the initial adjustment of the detector.

10 Claims, 2 Drawing Figures

ELECTRONIC SIDE OF LINE DETECTOR

BACKGROUND OF THE INVENTION

1. Field of the Invention

The invention relates to tip party identification in a two party line for a telephone communication switching system, and more particularly to detect the presence of a specific current to ground when one of the two subscribers is connected.

2. Description of the Prior Art

The invention was developed for the system shown in U.S. Pat. No. 3,767,863, issued Oct. 23, 1973, by Borbas et al for a Communication Switching System with Modular Organization and Bus, hereinafter referred to as the System S2 patent.

In previous systems the side of line (SOL) signal was detected using a differential current sensing relay. One such system using a differential current sensing relay is shown in U.S. Pat. No. 3,678,197, issued July 18, 1972 by Panter et al for a Dial Pulse Incoming Trunk and Register Arrangement. This relay is fairly large and does not readily lend itself to card mounting. Also this relay has an inherent problem with sensitivity to shock, vibration, and orientation. Further, in past years this current sensing relay circuit has required extensive maintenance, due to the extremely short travel of the relay springs and the accuracy with which this adjustment must be maintained.

Two applications of operational amplifiers in telephone circuits are Tjaden, U.S. Pat. No. 3,622,709 for a Supervisory Circuit for Telephone Lines and Stewart, U.S. Pat. No. 3,812,303 for a Differential Loop Current Detector. Tjaden shows an operational amplifier with voltage detectors which is utilized to indicate the opening and closing of the two wire loop to indicate seizure and dial pulsing. This system performs a supervisory function for detecting the operative state of circuits only. Stewart is directed more closely to the subject of the present invention as it actually does sense and measure direct current unbalances in a two wire loop. However, it is designed with two operational amplifiers and may be intended to be used as an instrument to actually measure the amount of unbalance. This measurement could be made in conjunction with a meter or any voltage measuring device to measure the absolute value of this current unbalance. In order to be used as replacement for an existing SOL detector relay which senses tip party identification, additional components would have to be added to the circuit. Even on adding the additional components it still could have limitations because of the large number of balanced or matched resistors required which increases the cost and reliability of the circuit. Further, the resistors would also have to be thermally tracking in that as the temperature changes, the variation in resistance from resistor to resistor should be similar (percentage). Also it would appear that the circuit would not reject leakage and would be sensitive to 60 hz noise which would produce false outputs.

SUMMARY OF THE INVENTION

According to the invention, an IC differential amplifier is driven by a voltage supply divider network from the system −50 volts. The subscriber's loop is connected to the amplifier via the switching network through a voltage divider network which includes a variable resistor to adjust the amplifier output. The amplifier is output to a transistor comparator circuit which is coupled to another transistor which provides the output signal. The comparator voltage reference allows the rejection of leakage and noise. Diodes are provided to protect the amplifier from voltage spikes, both positive and negative. The voltage supply divider network, amplifier, and comparison transistors are provided with test points in order to allow the initial adjustment and to facilitate testing these particular subcircuits of the detector.

A first object of the invention is to provide an electronic side of line detector which can be mounted on a circuit card;

A second object of the invention is to provide a detector which is not sensitive to shock, vibration, or orientation;

A third object of the invention is to provide a detector which requires very little maintenance;

A fourth object of the invention is to provide a single adjustment to set the amplifier circuit output;

A fifth object of the invention is to eliminate false outputs caused by 60 hz AC pulses from noisy lines;

A sixth object of the invention is to provide a side of line detector which uses only one operational amplifier;

A seventh object of the invention is to use relatively few resistive components;

An eighth object of the invention is to provide protection for the amplifier from negative and positive voltage spikes;

A ninth object of the invention is to provide leakage and noise rejection for the circuit;

A tenth and final object of the invention is to provide test outputs for the subsystems of the invention.

BRIEF DESCRIPTION OF THE DRAWINGS

The above-mentioned and other features and objects of this invention and the manner of obtaining them will become more apparent, and the invention itself will be best understood by reference to the following description of the embodiment of the invention taken in conjunction with the accompanying drawings, in which.

DESCRIPTION OF THE PREFERRED EMBODIMENT

Figure 1:
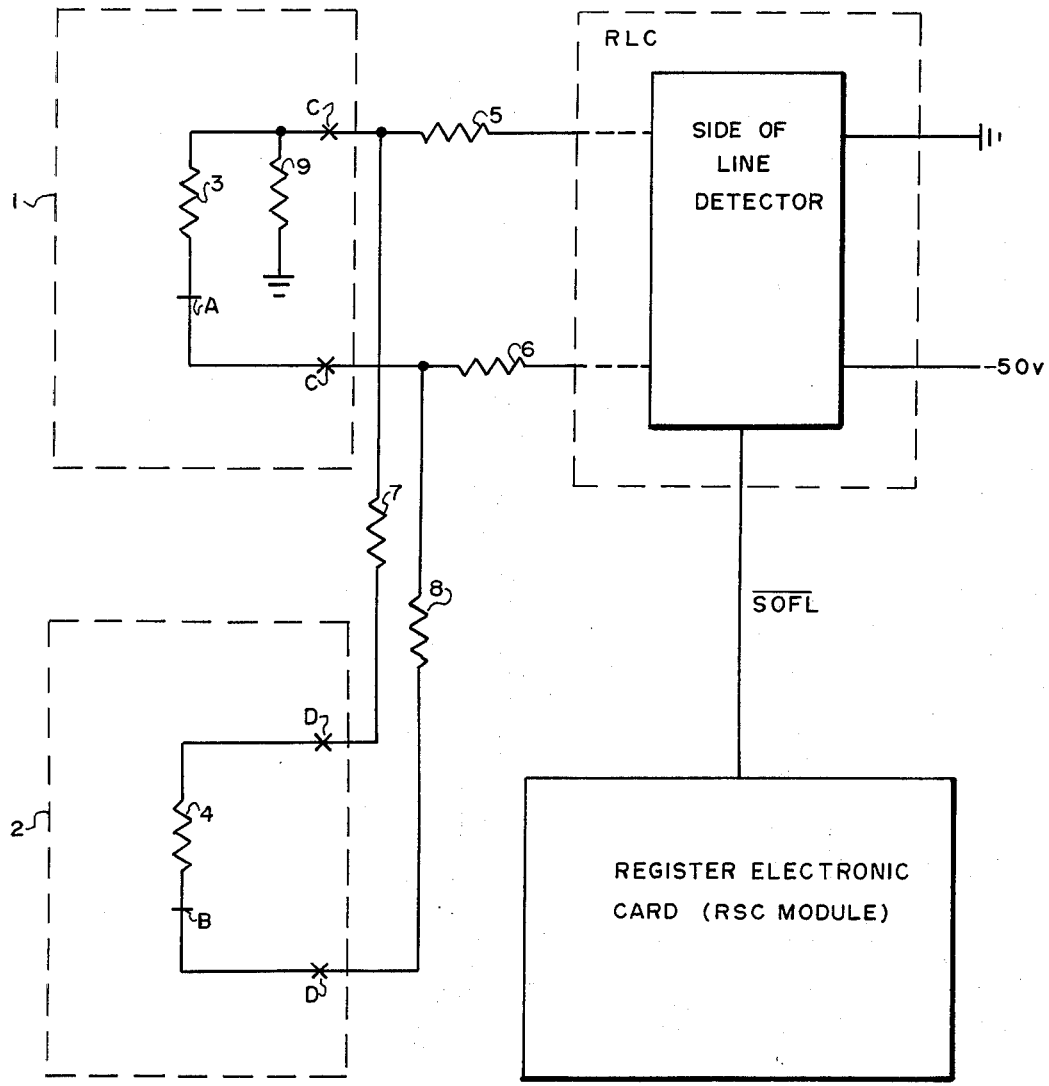
FIG. 1 is a block diagram of a system utilizing the improved side of line detector.

FIG. 1 shows the improved side of line detector connected to ground and the −50 volts of the system with its output ($\overline{SOFL}$) connected to the register card (RSC module). The input is connected to a particular two party line having subscribers 1 and 2. Resistors 5, 6, 7, and 8 indicate the resistance of the loop itself while resistors 3 and 4 (subscriber 1 and subscriber 2 respectively) are representative of the approximately 200 ohm subset resistance in the actual subscriber telephone receiver. Resistor 9 is the tip party mark resistance which allows the system to operate. This resistor is typically 2,650 ohms and is usually a part of the subsets ringer coil. This resistor 9 in subscriber 1's receiver allows the system to detect (via the side of line detector) when subscriber 1 is connected to the register. Contacts A and B in the receivers of subscribers 1 and 2 are the pulsing contacts of the receivers, while contacts C and D are those of the hookswitch.

While FIG. 1 shows one particular two party line, a system such as System S2 would have thousands of such lines (4,800 maximum lines for System S2). Each of these lines within a particular system can be a single party, two party, or a multiparty line. The side of line detector is used to distinguish between the two parties on each two party line in order to allow Automatic Number Identification (ANI) on such lines. Since the SOL detector is part of the register (RLC) and since a register is always connected to the lines for dialing, detection is also performed at the same time between dialed or keyed digits.

Figure 2:
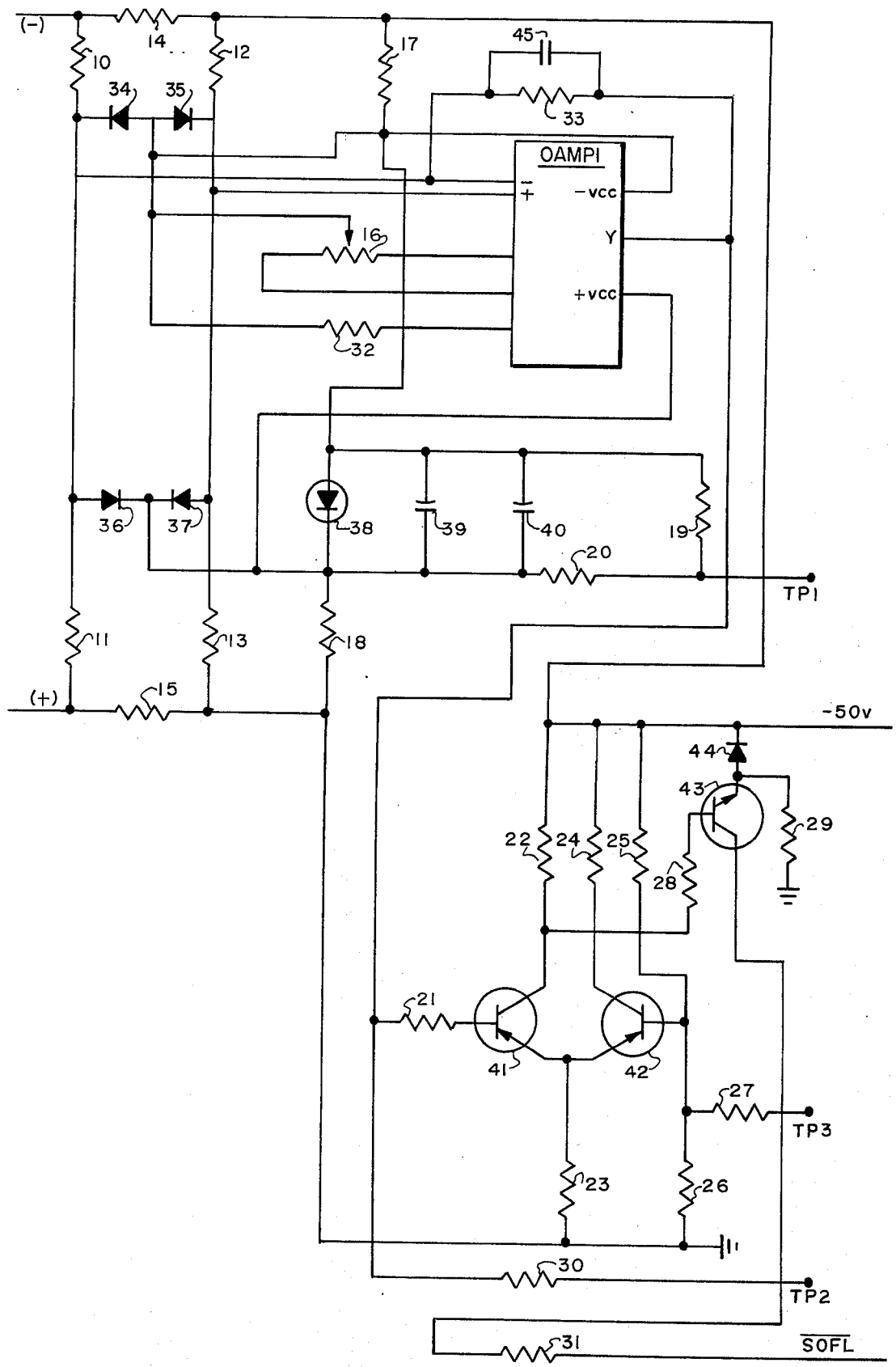
FIG. 2 is a schematic diagram of the improved side of line detector.

FIG. 2 shows the schematic diagram of the improved side of line detector. OAMP1 is an operational amplifier which which could be an industry type 741, an internally compensated single operational amplifier. The input voltage divider network of R10 and R11 (+ and − input leads) is coupled to the subscriber loop as shown in FIG. 1. The output of the network is signal $\overline{SOFL}$ which is coupled to the register circuit as also shown on FIG. 1 to be utilized by the rest of the register logic.

The VCC supplies for OAMP1 are derived from the −50 volt supply of the telephone system and ground via the voltage divider network of resistors 17, 18, and zener diode 38. These provide a minus VCC of −36 volts and a plus VCC of −14 volts to the amplifier. Capacitors 39 and 40 provide noise suppression for zener diode 38. A further voltage divider network of resistors 19 and 20 provides a −25 volt circuit test point TP1 used during the initial adjustment. This adjustment is performed using variable resistor 16 and thereby obtaining approximately 0 volts between TP1 and TP2 with a suitable resistance connected between the (+) and (−) leads. On the input, diodes 34 and 35 provide a protection path for OAMP1 to protect it from negative going voltage spikes, while diodes 36 and 37 protect the amplifier from positive going voltage spikes. Resistors 12 and 13 form another voltage divider to hold the plus input of OAMP1 at a reference voltage of −25 volts.

In FIG. 1, when subscriber 2 is off hook (contacts D operated) and is connected to the side of line detector, since there is no resistor connected to ground then of course no unbalance exists (other than leakage to ground) and no output will be produced from the side of line detector. Resistor 32 provides the negative bias for the amplifier. However, if instead subscriber 1 is off hook (contact C operated) and is connected to the register, the resistance to ground provided by resistor 9 will cause the voltage drop across resistor 14 to increase with respect to 15 and thereby cause the negative (or inverting) input of OAMP1 to go more positive than −25 volts (under a balanced condition the negative input should be at −25 volts). This will drive the output (Y) of the amplifier negative, with the gain of the amplifier being governed by the value selected for resistor 33 and capacitor 45 in the feedback loop. The output of OAMP1 can be read at test point TP2 through isolating resistor 30. This output is also coupled via resistor 21 to the base of transistor 41 of the comparison circuit formed by transistors 41 and 42 and their associated elements.

The DC voltage dropped across resistor 23 is held constant by the bias network of transistor 42 comprised of resistors 25 and 26. In this way transistor 41 may only turn on after −21.4 volts (which corresponds to the base voltage of transistor 42) appears at the output of OAMP1. At this point the collector of transistor 41 will go more positive which in turn turns on output transistor 43 via resistor 28. The base voltage of transistor 42 can be checked at test point TP3 through blocking resistor 27. Diode 44 on the emitter lead of transistor 43 holds the emitter at a slightly more positive potential than the −50 volt rail. This insures that transistor 43 will not be turned on by leakage or noise variations at its base by providing a larger turn on threshold. Diode 44 is held in an ON condition, keeping the voltage drop across it constant, by connecting it to ground through resistor 29. When subscriber 1 is connected to the loop, transistor 43 will conduct with its collector current driving the side of line $\overline{SOFL}$ output low (negative) indicating a side of line condition is present.

The design of the side of line detector allows it to be used strictly to detect tip party identification and as an exact replacement for the above-mentioned previously used relay. The side of line detector will produce an output only when subscriber 1 is connected, and further only when the party resistance is within a specific range which is normally around the 2,650 ohms indicated by resistor 9 in FIG. 1. Since telephone lines always display a finite leakage resistance to ground, when subscriber 2 is connected to the loop, the side of line detector must reject this leakage and not produce an output. The minimum worse case leak which will be rejected by the side of line detector is a 15,000 ohm leak to ground. Under normal conditions a 10,000 ohm leak will be rejected. This leakage protection is provided by the voltage comparator formed by transistors 41 and 42 and also by diode 44 and resistor 29 in the emitter circuit of output transistor 43. This threshold must be overcome by any legitimate signal. This also permits the circuit to function properly even in the presence of a + or −5 volt ground shift between the register electronic card ground (FIG. 1) and the subscriber 1. Also, the detector is designed to eliminate false outputs from the 60 hz AC signals produced by noisy lines which is provided by the feedback capacitor 45. The circuit will function properly with 3 volts RMS 60 hz AC induction present on tip and ring to ground (common mode voltage). This value is the REA specification for common control central offices.

While principles of the invention have been illustrated above in connection with specific apparatus and applications, it is to be understood the description is made only by way of example and not as a limitation on the scope of the invention as encompassed by the following claims.

We claim:

1. An improved side of line detector for a communication switching system, said system coupled to at least one line including a first and second subscriber loop connected one at a time, said first subscriber loop having a mark impedance coupled to ground, said improved side of line detector comprising:
    differential amplifier means having at least two inputs for producing an output signal when said two inputs are not equal;
    input voltage divider means coupled to said line including,
    first divider means for holding a first input of said amplifier means at a reference voltage, and
    second divider means for holding a second input of said amplifier means at said reference voltage only when said mark impedance is not connected to said line;

comparison output means coupled to said differential amplifier means for producing a side of line signal when said differential amplifier means produces an output signal;

whereby only when said first subscriber loop and mark impedance is connected to said line, said comparison output means will produce said side of line signal.

2. An improved side of line detector as claimed in claim 1 wherein:
said differential amplifier means comprises a single operational amplifier.

3. An improved side of line detector as claimed in claim 1 wherein:
said differential amplifier means includes a voltage supply divider network means, including noise suppression means.

4. An improved side of line detector as claimed in claim 3 further including:
voltage spike suppression means coupled to said differential amplifier means;
whereby said differential amplifier means is protected from negative and positive voltage spikes.

5. An improved side of line detector as claimed in claim 3 further including:
amplifier output test means.

6. An improved side of line detector as claimed in claim 1 wherein, said input voltage divider means further includes:
amplifier output adjustment means.

7. An improved side of line detector as claimed in claim 1 wherein, said comparison output means further includes:
comparison test means; and
transistor output means.

8. An improved side of line detector as claimed in claim 7 wherein, said transistor output means further includes:
leakage reduction means; and
noise variation suppression means;
whereby only when said first subscriber loop is connected said transistor output means will produce said side of line signal.

9. An improved side of line detector as claimed in claim 1 wherein:
said input voltage divider means further includes;
amplifier output adjustment means,
said differential amplifier means further includes;
voltage supply divider network means, including noise suppression means;
amplifier output test means;
voltage spike suppression means; and
said comparison output means further includes;
comparison test means; and
transistor output means including,
leakage reduction means, and noise variation suppression means.

10. An improved side of line detector as claimed in claim 9 wherein:
said differential amplifier means comprises a single operational amplifier.

* * * * *